3,378,928
INSTRUMENT FOR MARKING IN THE
CUTS ON ROOF RAFTERS
Percy S. Hawkins, 2343 Marshall Ave. SE.,
Grand Rapids, Mich. 49507
Filed Oct. 28, 1966, Ser. No. 590,389
5 Claims. (Cl. 33—90)

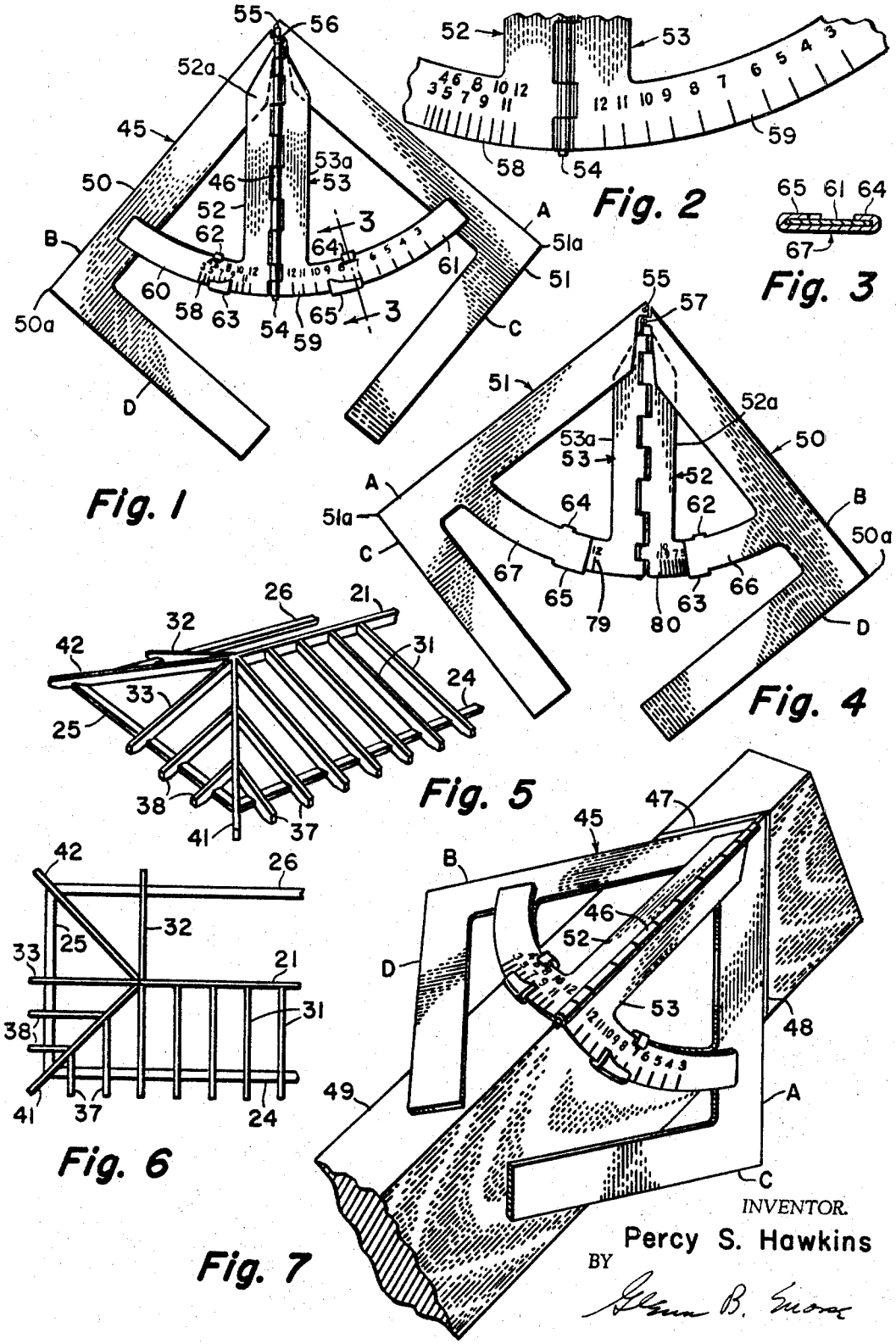

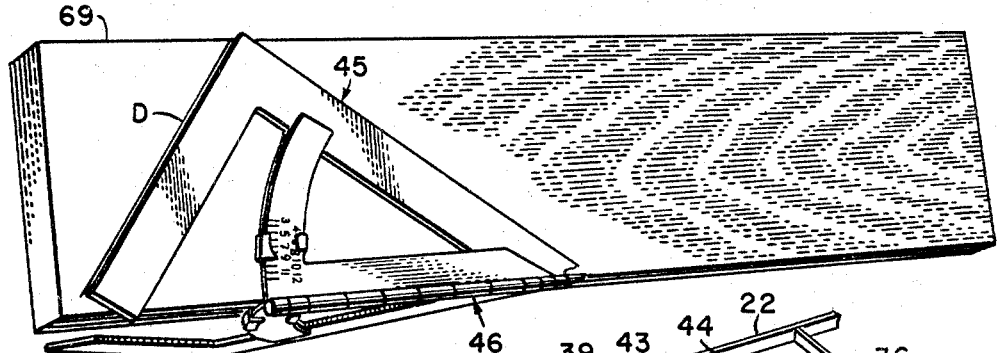
Fig. 8
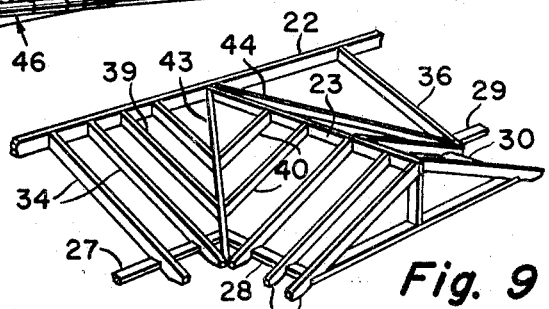
Fig. 9
Fig. 10
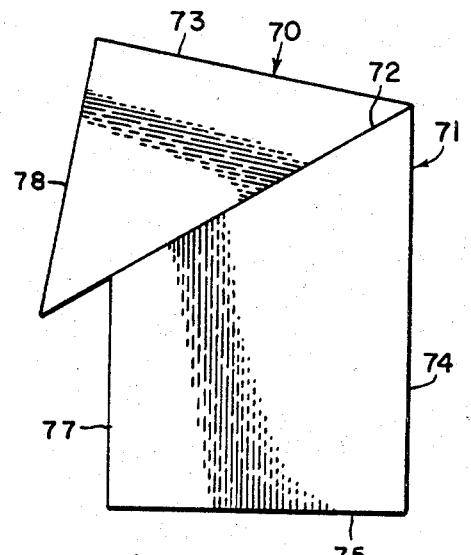
Fig. 11
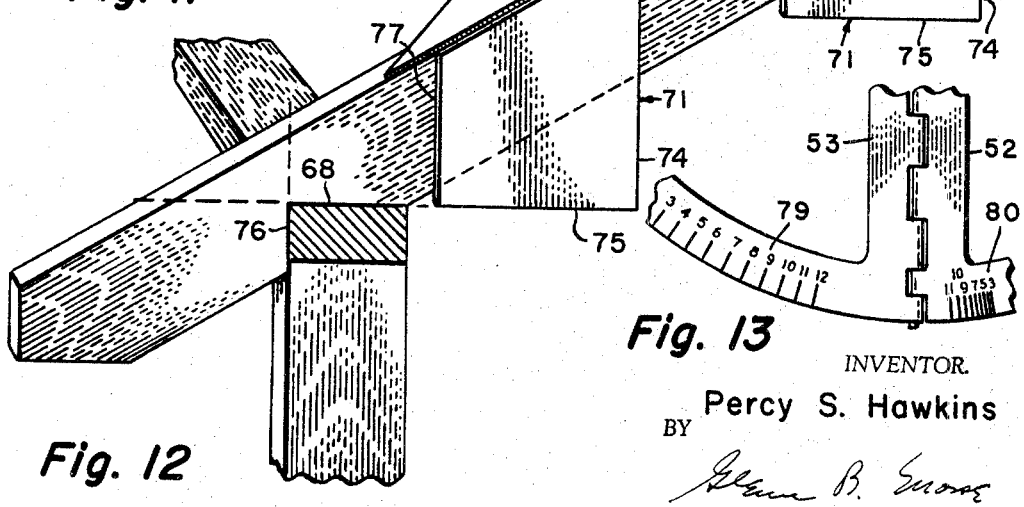
Fig. 12
Fig. 13
INVENTOR.
Percy S. Hawkins
BY United States Patent Office 3,378,928
Patented Apr. 23, 1968

ABSTRACT OF THE DISCLOSURE

An instrument for locating the cuts on structural members that interengage at standard angular relationships, the instrument having right-angle members hinged with respect to each other, the apex of said right-angle members being centrally disposed thereon so that the legs of each of said right-angle members locate the traces of complementary cuts on a particular side of a structural member.

This invention provides an instrument that can be used by a house-builder to indicate the cuts to be made on lengths of timber to produce roof rafters. Rafters engage other structural members at an assortment of angles, and these angles must determine the cutting planes on the rafter timbers, if there is to be a reasonable fit and a sound structure. The principal characteristic of a roof is its slope, which is given in terms of inches of vertical "rise" per foot of horizontal "run." A variety of roof configurations are possible within the same slope, producing typical intersection conditions where the rafters engage other components. Were it not for the availability of tables of angle data for all of the standard slopes and conditions, the house builder would either have to resort to some form of instrument constructed to indicate the various cutting planes, or he would have to be an expert geometrician.

Instruments for this general purpose are known, and the present invention is considered to be an improvement over these with regard to simplicity of operation, the variety of information indicated, and economy of construction. Prior devices of this general character are shown in the following U.S. patents: Hampton, 718,344, 1903; Adams, 975,494, 1910; Adkins, 1,039,076, 1912; Raymond, 1,136,367, 1915; Callahan, 2,631,376, 1953.

The several features of the invention will be analyzed in detail through a discussion of the particular embodiments illustrated in the accompanying drawings.

In the drawings:

FIGURE 1 is a plan view of the preferred form of the invention.

FIGURE 2 is a fragmentary plan view on an enlarged scale showing the central portion of the instrument shown in FIGURE 1.

FIGURE 3 is a section on the plane 3—3 of FIGURE 1, on an enlarged scale.

FIGURE 4 is a bottom view of the instrument shown in FIGURE 1.

FIGURES 5 and 6 are perspective and plan views, respectively, of a typical "hip" roof structure.

FIGURE 7 shows the manner in which the instrument shown in FIGURE 1 is applied to a timber to indicate the cuts of the upper extremity of a "hip jack" rafter or the lower extremity of a "valley jack" rafter.

FIGURE 8 shows the manner in which the instrument illustrated in FIGURE 1 is applied to a roof board to indicate the end cut at the junction with a "hip" or a "valley" rafter.

FIGURES 9 and 10 are perspective and plan views, respectively, of a "valley" arrangement in conventional roofing structure.

FIGURE 11 shows a modified form of the invention in which hinged panels provide indications of cut for a given roof slope.

FIGURE 12 is a perspective view showing the manner in which the device illustrated in FIGURE 11 can be applied to a timber to indicate the various cuts involved to produce a roof rafter.

FIGURE 13 is a view of the scales on the opposite side of the device from that of FIGURE 1.

As an introduction to an analysis oft he preferred and modified forms of the invention, it will be advisable to discuss the somewhat peculiar terminology that has developed in the trade with regard to the identification of the various components of a roof structure, and the terms identifying the various cuts and intersecting surfaces. A word of caution is in order here, as some of these terms are not precisely what an expert in three-dimensional geometry might expect. Referring particularly to FIGURES 5, 6, 9, and 10, an index of components may be listed for convenience as follows:

| Name of component: | Reference characters |
|---|---|
| Ridge | 21, 22, and 23 |
| Plate | 24–30 |
| Common rafters | 31–36 |
| Jack rafters | 37–40 |
| Hip rafters | 41, 42 |
| Valley rafters | 43, 44 |

The characteristic of the so-called "jack" rafters is that they do not extend all the way from the plate to the ridge, but terminate on the "hip" or "valley" rafters. Since the slope of the roof is given with regard to the general plane determined by the common rafters, it will be clear to anyone experienced in geometry that the angle of the hip and valley rafters with respect to the horizontal will not be quite the same as that of the common rafters. For the same amount of vertical projection, the hip and valley rafters (since they extend along a diagonal) will have a longer horizontal reach than will the common rafters, thus producing a different angular relationship at the junction with the ridge and plate. All of these conditions have to be indicated by a marking instrument that is to be of any practical significance. The junction of a jack rafter with a hip or valley will produce an intersection plane at the end of the jack rafter of the nature shown in FIGURE 7. The instrument generally indicated at 45 is shown set (on both scales) for a stated degree of "rise" of the roof. As viewed in FIGURE 7, the portion of the instrument to the left of the hinge 46 will indicate the direction of the "side cut" 47, and the portion of the instrument 45 to the right of the hinge 46 will indicate the direction of the "plumb cut" 48. It is here that the trade terminology is most confusing to a person who might be well-versed in geometry, but lacking in experience in house-building. Actually, the lines 47 and 48 are not "cuts" at all, but are the traces on the top and side of the timber 49 of a plane corresponding to the side face of a hip rafter, against which the jack rafter to be made from the timber 49 must fit. With the instrument set as desired, and laid upon the timber 49 as shown in FIGURE 7, a pencil mark will give the lines 47 and 48 as guides along which a hand saw can be directed to produce the end surface of the rafter.

The instrument 45 is formed by a pair of right-angle members 50 and 51 which are pivotally connected, respectively, with respect to the hinged members 52 and 53. The members 50 and 51 are each formed by the flat arms B-D and A-C, respectively, which meet at the central portions of the angle members to form the apices 50a and 51a. The members 50 and 52 move together about the hinge pin 54, and the members 51 and 53 also move together about this same hinge pin. This can be accomplished either by pivoting the angle members directly to the hinge members, or to a separate member carried by the hinge pin. One of these connections can be to an offset end of the hinge pin itself, as shown at 55. Since the hinge pin could be free to rotate with respect to both hinge members 52 and 53, a connection to the hinge pin can be made for either of the angle members 50 or 51. The angle members are preferably in adjacent overlaid relationship with the tangential leaf portions 52a and 53a of the associated hinge members, resulting in parallelism between the planes of the respective leaf portions and angle members. The pivotal connection with respect to the hinge members 52 and 53 permits the angle members 50 and 51 to assume various angular relationships with respect to the axis of the hinge pin 54. In the illustrated modification, the angle member 50 is pivoted to a small block 56, which is engaged by, and is free to rotate with respect to the hinge pin 54. A pivot pin 57 provides the fulcrum pivotally interconnecting the block 56 with the angle member 50.

The angular position of the members 50 and 51 with respect to the hinge members 52 and 53 is indicated by the scales 58 and 59, respectively. The arcuate scale arms 60 and 61 are embraced by the tabs 62–63 and 64–65 on the arcuate holding arms 66 and 67 associated with the angle members 50 and 51, respectively. The tabs 63 and 65 are preferably formed as shown in FIGURE 1 to provide a point at the extremity nearest the hinge axis for registry with the scales 58 and 59. These scales read in terms of "rise" which is the characteristic identification for the slope of the roof. A given rise is to be inserted in the instrument by placing the angle members so that the same reading appears on both scales 58 and 59. When set in this manner, the edge A will give the direction for the so-called "plumb cut" of common and jack rafters, and the edge B will correspond to the "side cut" of jack rafters. The edge C will produce the "level cut" of common and jack rafters, as shown at 68 in FIGURE 12. The edge D will give the end bevel for roof boards, as indicated. The edge D will produce a line corresponding to the intersection of the roof board (laid parallel to the plate), with the hip or valley rafter. A board 69 cut along this line will register with a similarly-cut board laid along the opposite adjoining face of the roof.

The reverse side of the device from that shown in FIGURE 1 is provided with the scales 79 and 80 shown in FIGURE 13. These scales are laid out so that the instrument can be set with the desired "rise" indicated on these scales, with the resulting angular relationship of the members 50 and 51 producing the proper position for the plumb and side cuts at the upper ends of hip or valley rafters, and the plumb and level cuts at lower ends of hip or valley rafters. The edge A will then give the plumb cut of hip or valley rafters, the edge B will give the side cut of the hip or valley rafters, and the edge C will give the level cut of hip or valley rafters.

It should also be noted that there should be at least 270 degrees of freedom about the hinge 46, as this feature will make it possible to use the instrument in either "right" or "left" hand position. The opposite sides of the roof structure can thus be marked with the same instrument.

FIGURES 11 and 12 show modifications of the invention in which sheets of cardboard or other panel material can be linked together with tape, or some inexpensive equivalent of a hinge, to produce a device functioning in the same manner as the tool 45 for a given amount of roof slope. These units, such as shown in FIGURE 11, may be printed in quantity, and handed out by lumber yards as give-away items to persons purchasing lumber. The panel 70 is hinged to the panel 71 along the hinge line 72 by any convenient arrangement, with the angle between the line 72 and the edges 73 and 74 being selected according to the particular roof slope. This information would normally be printed directly on the device in any convenient manner. The uits are used as shown in FIGURE 12, with the edge 74 producing the "plumb cut" in the same manner as the edge A of the tool 45. The bottom edge 75 forms a convenient indicator for the "level cut" 68, with the cut 76 being made along the orientation of either of the parallel edges 74 or 77. The edge 73 would correspond to the position of the edge B of the tool 45. The edge 78 would correspond to the edge D of the tool 45. The angular relationships between the edges 73 and 74 and the hinge axis 72 are worked out according to known principles of three-dimensional (solid) geometry, assuming standard arrangements of the structural components. The same is to be said for the scales 58, 59, 79, and 80 of the tool 45.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. An instrument for determining the side traces of intersecting planes on structural members, said instrument comprising a hinge pin interconnecting interengaged hinge members, each of said hinge members having a surface thereof lying in a plane substantially tangent to said hinge pin, first and second pivotal members each including perpendicularly related legs, means pivotally interconnecting said first and second pivotal members and said first and second hinge members, respectively, on adjacent axes of rotation, each of said pivotal members being flat, and having a flat surface normally positioned in face to face engagement with a respective hinge surface lying within said plane whereby a flat face of each of said hinge and pivotal members is substantially tangent to said hinge pin, the apex of said perpendicularly related legs being centrally disposed thereon; and reference means on said hinge members and pivotal members, respectively, indicating the angular relationship of each of said pivotal members with respect to the axis of said hinge members.

2. An instrument as defined in claim 1, wherein the pivotal connection of said pivotal members to said hinge members is disposed at the side of said hinge members adjacent the axis thereof.

3. An instrument as defined in claim 1, wherein said reference means on one side of said instrument indicates positions for the cuts at the ends of common and jack rafters, and said reference means on the opposite side of said instrument indicate positions for the cuts at the ends of hip or valley rafters.

4. An instrument for determining the side traces of intersecting planes on structural members, said instrument comprising: interengaged first and second hinge members, each of said hinge members having a tangential leaf portion; first and second right-angle members each having a leg pivotally connected with respect to said first and second hinge members, respectively, on adjacent axes of rotation, said right-angle members being flat, and disposed in planes substantially parallel to and adjacent said tangential leaf portions, respectively, the apex of said right-angle members being centrally disposed thereon, reference means on said hinge members and right-angle members, respectively, indicating the angular relationship of each of said right-angle members with respect to the axis of said hinge members, said reference means includes interengaged arcuate arms on said hinge members and right-angle members, and scales indicating the relative position of said arcuate arms, said arms having a center of curvature substantially coincident with the axes of pivotal connection of said right-angle members, respectively.

5. An instrument as defined in claim 4, wherein certain of said arcuate arms are provided with opposite tabs embracing the arcuate arm adjacent thereto, one of said opposite tabs providing an index cooperating with a scale on said adjacent arcuate arm, and the other of said opposite tabs serving as a stop limiting the relative movement of said adjacent arcuate arms.

References Cited

UNITED STATES PATENTS

| 15,600 | 8/1956 | Crofoot | 33—90 |
| 425,698 | 4/1890 | Roberts | 33—90 |
| 718,344 | 1/1903 | Hampton | 33—90 |

FOREIGN PATENTS 460,296  5/1928  Germany.

HARRY N. HAROIAN *Primary Examiner.*

LEONARD FORMAN, *Examiner.*